United States Patent [19]

Maier

[11] Patent Number: 4,638,599
[45] Date of Patent: Jan. 27, 1987

[54] GEAR GRINDING MACHINE FOR RADIAL OR HELICAL SPUR GEARS

[76] Inventor: Kurt Maier, Langestrasse 112, D-7500 Karlsruhe 51, Fed. Rep. of Germany

[21] Appl. No.: 684,591
[22] PCT Filed: Jun. 8, 1984
[86] PCT No.: PCT/DE84/00130
§ 371 Date: Dec. 28, 1984
§ 102(e) Date: Dec. 28, 1984
[87] PCT Pub. No.: WO84/04894
PCT Pub. Date: Dec. 20, 1984

[30] Foreign Application Priority Data

Jun. 9, 1983 [DE] Fed. Rep. of Germany ....... 3320914

[51] Int. Cl.⁴ .............................................. B24B 3/00
[52] U.S. Cl. .................................. 51/52 R; 51/123 G; 51/95 GH
[58] Field of Search ............... 51/52 R, 52 HB, 287, 51/123 G, 50 R, 95 R, 95 GH, 105 GG

[56] References Cited

U.S. PATENT DOCUMENTS 4,393,625 7/1983 Bloch et al. ............... 51/95 GH
4,512,109 4/1985 van de Löcht ............. 51/123 G

FOREIGN PATENT DOCUMENTS 0069274 1/1983 European Pat. Off. .
2840940 2/1980 Fed. Rep. of Germany .
0418784 2/1967 Switzerland .
0517547 2/1972 Switzerland .
0863338 3/1961 United Kingdom .

Primary Examiner—Frederick R. Schmidt
Assistant Examiner—Robert A. Rose
Attorney, Agent, or Firm—Silverman, Cass, Singer & Winburn, Ltd.

[57] ABSTRACT

The invention relates to a gear grinding machine for straight toothed or oblique toothed spur gears, in which a main slide (2) reciprocable on the machine column and an auxiliary slide (7) reciprocable on the main slide are provided for producing the rocking motion. The direction of movement of the auxiliary slide (7) is at an angle to the direction of movement of the main slide (2). The auxiliary slide (7) is linked to a slider movable in a guide slot (9). In order to employ the machine also for form grinding, the guide slot (9) is adapted to be turned parallel to the direction of movement (II) of the slide (7) and is locked in this position. Thus, a gear grinding machine is created which is suitable both for generation grinding and form grinding.

4 Claims, 2 Drawing Figures

GEAR GRINDING MACHINE FOR RADIAL OR HELICAL SPUR GEARS

The present invention relates to a gear grinding machine for producing radially or helically toothed spur gears.

From the state of the art there is known a gear grinding machine of this general type which operates according to the generation grinding process (U.S. Pat. No. 4,512,109, issued Nov. 23, 1985 to van de Locht). This prior art gear grinding machine is provided with a rocking drive including an arcuate rolling member and a clamping fixture, and an auxiliary slide coupled to the main slide is linked to a sliding element which is movable in a guide slot. The guide slot is angularly adjustable on the machine bed for determining the side of the base circle diameter of a gear being machined.

It is also generally known to construct gear grinding machines so that they operate according to the formed-wheel grinding process. Such machines are of a special construction suitable to execute gear grinding by the forming process.

By contrast, the object of the present invention is to create a gear grinding machine of the type first referred to in the above which machine is, in a simple manner and without requiring any elaborate changeover, capable of performing both generation and form grinding of gears.

This is accomplished according to the invention in that for the optional employment of the machine for form grinding the guide slot is adapted to be angularly adjustably moved into a position, and locked therein, which is parallel to the direction of movement of the auxiliary slide, that the work slide is mounted on a vertically adjustable slide, and that the auxiliary slide is operable according to the position of the vertically adjustable slide in dependence of the helix angle and the data of a gear.

This has the advantage that a gear grinding machine is created in a convenient manner, which machine is capable of operating according to both the generation and the forming process. In the forming process, the main slide is at rest. The motion of the auxiliary slide merely causes the belt drive to impart rotational motion to the arcuate rolling member, leading to an angular adjustment of the directional position of the guide slot of the sliding element to thereby set the machine up for form grinding.

While it has been proposed heretofore to provide a gear grinding machine with a vertically adjustable slide for angularly adjustably mounting the grinding wheel carrier thereon, this known structure is used for form grinding only and no provision is made for the machine to also operate as a generation grinder.

In further developing the invention, the direction of movement of the auxiliary slide may run at an angle of 45° to the direction of movement of the main slide, and the direction of movement of the sliding element is also at an angle of 45° relative to the direction of movement of the main slide.

According to another feature of the invention, incremental acceleration or deceleration of the rotation of the workpiece table may be attained by the interposition of electronic control means, whereby such incremental speeding up or slowing down of the rotational speed of the workpiece table during the motion of the work slide is variable. Thus, in a simple fashion, chip formation is effected according to the desired direction (left or ride side of the tooth profile). In addition, cambering of the left or right tooth side is easily accomplished.

The invention will be further described in the following with reference to one embodiment illustrated in the drawings, in which.

Figure 1:
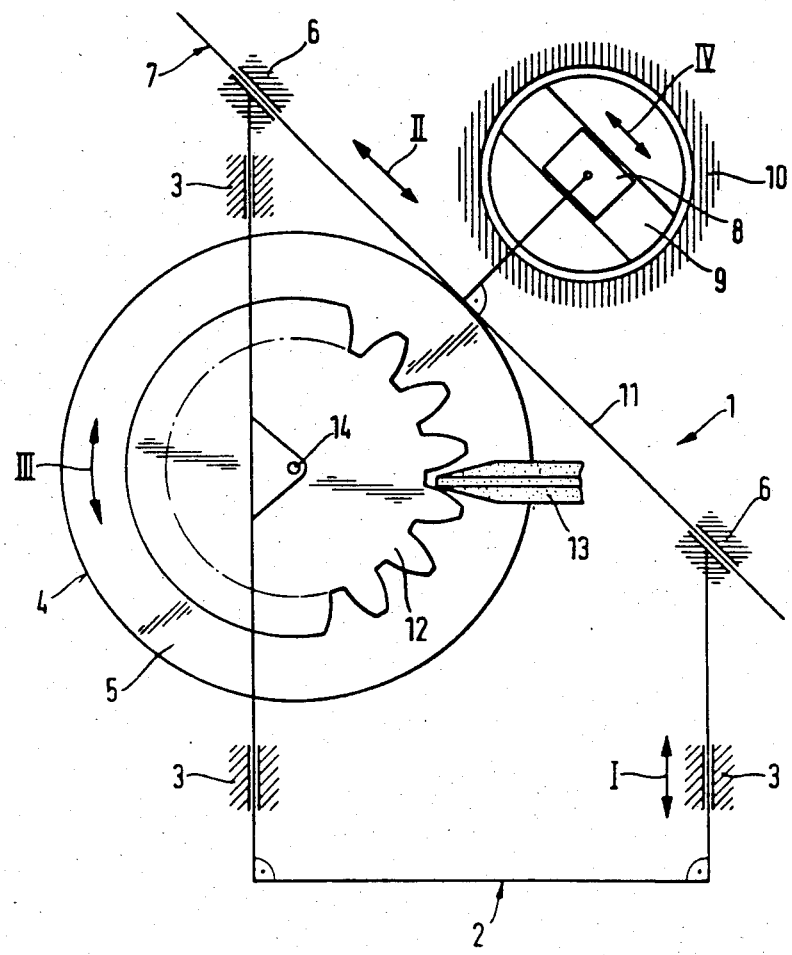
FIG. 1 is a top plan view of a diagrammatically shown basic construction of the rocking drive mechanism.

FIG. 1 illustrates diagrammatically a basic construction of the rocking/rolling drive mechanism according to the invention. This rocking drive mechanism 1 comprises a main slide or saddle 2 and an auxiliary or cross slide 7. The main slide 2 is mounted in guides 3 on the machine for advancing and retarding motion in the direction of the arrow I. In addition, the main slide 2 is provided with two guides 6 for the auxiliary slide 7 to be tangentially moved at an angle to the axial movement of the main slide 2, resulting in a path of movement II of the auxiliary slide 7.

The auxiliary slide 7 is linked to a sliding element 8 movable in a guide track or slot 9. The guide slot 9 is angularly adjustable with respect to the machine bed.

The auxiliary slide 7 is further provided with a belt drive 11 for cooperation with an arcuate rolling member 4. The arcuate rolling member is rotatable about its axis 14 mounted on the main slide 2. Coaxial therewith is a workpiece table 5 having disposed thereon a gear 12 to be machined. A grinding wheel 13 operates to produce an involute gear in accordance with the generation grinding method, when the guide slot 9 of the slider 8 is set at an angle relative to the direction of movement II of the auxiliary slide 7. The size of the base circle diameter of the gear being machined is determined by the adjustable angular position of the slot 9 in the machine bed 10.

Now, according to the invention, the slider 8 with its slot 9 as shown in FIG. 1 is adapted to be turned into a position and fixedly held therein which is parallel to the direction of movement II of the auxiliary slide 7. By this measure, the main slide 2 is prevented from movement in the direction I, as distinct from the generation grinding process. Following the movement of the auxiliary slide 7 in the direction of movement II, the belt drive 11 merely causes the arcuate rolling member 4 to turn in the direction of the arrow III.

The direction of movement of the slider 8 and the auxiliary slide 7 may be at an angle of 45° to the direction of movement I of the main slide 2.

Figure 2:
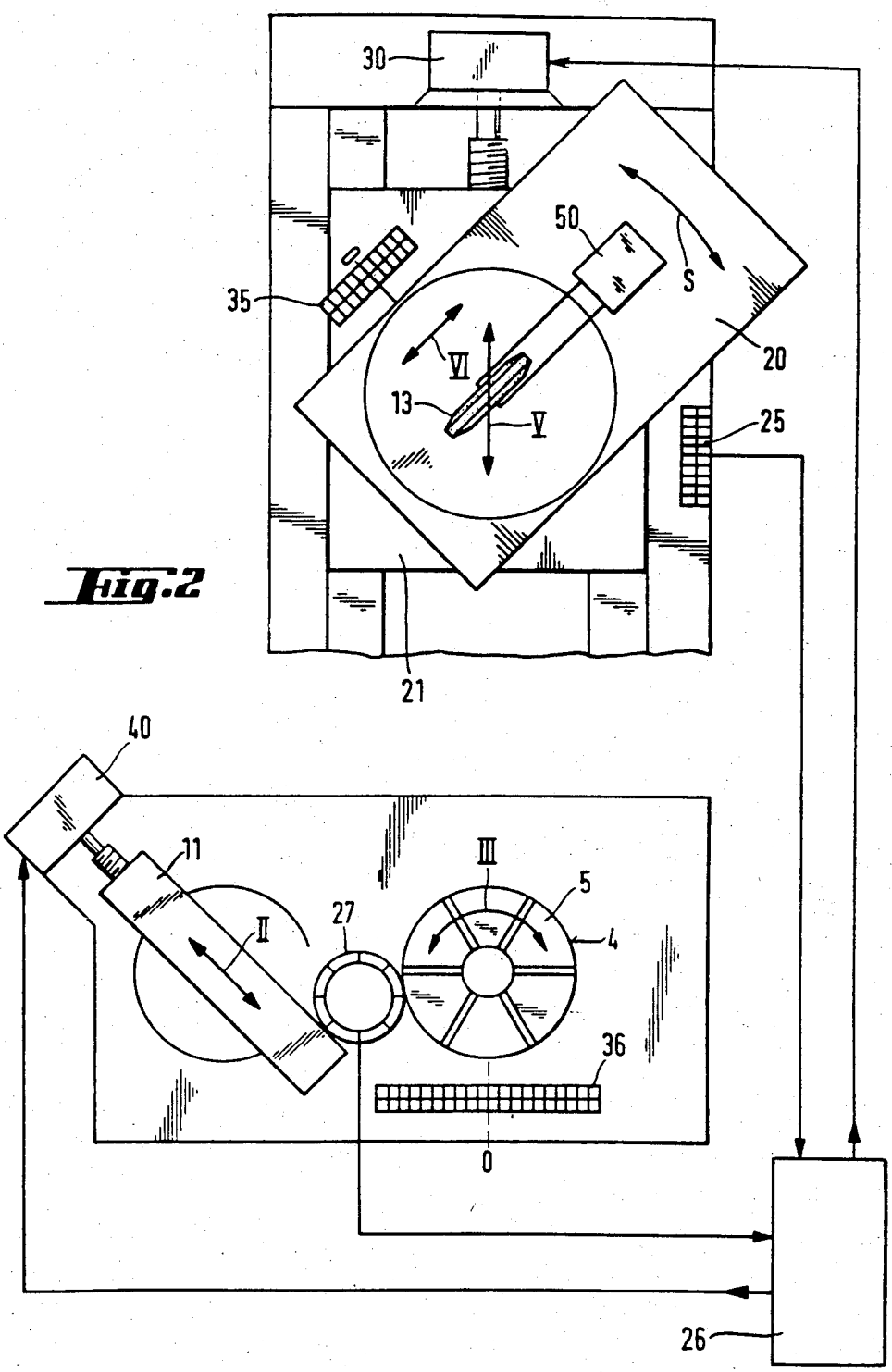
FIG. 2 is a diagrammatic view of a gear grinding machine, showing the work slide in a frontal view and the main slide in a top plan view.

FIG. 2 is a diagrammatic representation of a gear grinding machine, shown partially in a front view and partially in a top plan view. As will be seen, there is provided a workpiece table 5 and an arcuate rolling member 4. An electronic transmitter 27 is interposed for the arcuate rolling member 4 to be driven by belt drive 11. The belt drive 11 in turn is connected to electronic control means 26.

Furthermore, a tool slide 20 is swingably and vertically adjustably mounted on an adjustable slide 21, as shown in the frontal view of FIG. 2. An electronic transmitter 25 is provided to effect monitoring by electronic control means 26, whereby the adjustable slide 21 is positioned depending upon the gear being machined. The grinding wheel 13 executes a forward stroke in the direction of the arrow V. To accommodate the helix angle of the gear, the work slide 20 is movable in the direction of the arrow S. In this position, shown in FIG. 2, the gear grinding machine operates according to the forming process, i.e. the slider 8 with its slot 9 is moved into a position which is parallel to the direction of movement II of the auxiliary slide 7, as it is shown in FIG. 1. Moving the guide slot 9 of FIG. 1 into a position which is at an angle relative to the direction of movement II of the auxiliary slide 7 will convert the gear grinding machine to the generation grinding process as disclosed by DE-PS 31 26 768. The electronic transmitters 35 and 36 shown in FIG. 2, which themselves are connected to electronic control means 26 in a manner not illustrated, ensure that when the machine has been set to form grinding, the grinding wheel during movement in the direction V will accurately point in the axial direction to the workpiece table 5.

In the generation grinding process, the drive of the slide 20 is effected by a drive unit 30 in the direction VI, and in the forming process the drive of the slide 20 is effected by the drive unit 30 in the direction V. The drive unit 30 itself is connected to the electronic control means 26. For driving the belt drive 11, a drive unit 40 is provided which likewise is connected to the electronic control means 26.

In the forming process, rotation of the workpiece table 5 according to the position of the work slide in dependence of the helix angle and the data of a gear is effected by means of the arcuate rolling member 4. Incremental turning or retardation of the workpiece table 5 may be effected by the electronic control means. Thus, the electronic control means is such that it permits of the superimposition of an additional functional motion. Due to such additional function, the workpiece table 5 is able to incrementally accelerate or decelerate in order to obtain a chip formation where it is desired (left or right side of the tooth profile). Furthermore, the electronic control 26 is so designed that this rotational movement, while the work slide keeps moving, may be preset to be variable (to give camber to the tooth profile), whereby such rotational movement may be different for the right and the left side of the gear teeth.

The invention provides in a simple manner a rocking drive mechanism for a gear grinding machine by which the gear grinding machine is capable of performing generation grinding as well as form grinding.

I claim:

1. A rolling type gear grinding machine for grinding radially or helically toothed spur gears including a rolling mechanism having a translational and a rotational component for an involute tooth gear of the type including;

a machine stand having a plurality of guides mounted thereon;

a main slide mounted on at least two of said guides for reciprocating movement of said main slide along an axis on said stand, said main slide having at least two guides mounted thereon, said main slide providing said translational component;

an auxiliary slide mounted on said two guides on said main slide for reciprocating movement of said auxiliary slide along an axis which is at an angle to the axis of movement of said main slide;

means cooperating with said auxiliary slide for producing said rotational component, said means including a sliding element in a guide slot, said element capable of reciprocating movement in said guide slot, said guide slot being adjustable about an axis of rotation;

a belt drive cooperating with said auxiliary slide;

a workpiece table on said main slide;

an arcuate rolling member mounted on said workpiece table and drivably connected to said auxiliary slide via said belt drive, said workpiece table being rotated by said arcuate rolling member;

the improvement comprising in combination:

said grinding machine further includes a vertically adjustable slide on said machine stand and a tool slide mounted on said vertically adjustable slide, said auxiliary guide being drivable according to the position of said main slide to the helix angle and other data pertinent to a gear to be ground, such that when said guide slot is adjusted and locked in a position parallel to said axis of movement of said auxiliary slide, said machine operates as a form grinding machine and, when said guide slot is rotated to a posotion which is at an angle relative to the axis of movement of said auxiliary slide, said grinding machine operates as a generation grinding machine.

2. Gear grinding machine according to claim 1, wherein the direction of movement of the auxiliary slide is at an angle of 45° relative to the direction of movement of the main slide, characterized in that the direction of movement of said sliding element (8) is at an angle of 45° relative to the direction of movement (I) of the main slide (2).

3. Gear grinding machine according to claim 1, characterized by electronic means for effecting incremental acceleration and deceleration of the rotation of the workpiece table (5).

4. Gear grinding machine according to claim 3, characterized in that the incremental acceleration or deceleration of the rotation of the workpiece table (5) during movement of the work slide (20) is variable.

* * * * *